United States Patent
Bernert et al.

(10) Patent No.: US 11,370,912 B2
(45) Date of Patent: *Jun. 28, 2022

(54) POLYMER SUITABLE AS A THICKENER

(71) Applicant: BYK-Chemie GmbH, Wesel (DE)

(72) Inventors: Dominika Bernert, Wesel (DE); René Nagelsdiek, Hamminkeln (DE); Alan L. Steinmetz, Louisville, KY (US); Justin Adams, Louisville, KY (US); George M. Zody, Louisville, KY (US); Wesley A. Huff, Wesel (DE); Daniela Leutfeld, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 183 days.

This patent is subject to a terminal disclaimer.

(21) Appl. No.: 16/604,733

(22) PCT Filed: Apr. 12, 2018

(86) PCT No.: PCT/EP2018/059394
§ 371 (c)(1),
(2) Date: Oct. 11, 2019

(87) PCT Pub. No.: WO2018/189294
PCT Pub. Date: Oct. 18, 2018

(65) Prior Publication Data
US 2020/0377723 A1 Dec. 3, 2020

(30) Foreign Application Priority Data
Apr. 13, 2017 (EP) .................... 17166407

(51) Int. Cl.
C08G 18/10 (2006.01)
C08L 75/08 (2006.01)
C09D 7/43 (2018.01)
C08G 18/22 (2006.01)
C08G 18/48 (2006.01)
C08G 18/71 (2006.01)
C08G 18/76 (2006.01)
C09D 5/14 (2006.01)
C08G 18/28 (2006.01)
C08G 18/75 (2006.01)
C08G 18/80 (2006.01)
C08G 18/78 (2006.01)

(52) U.S. Cl.
CPC .............. C08L 75/08 (2013.01); C08G 18/10 (2013.01); C08G 18/227 (2013.01); C08G 18/282 (2013.01); C08G 18/283 (2013.01); C08G 18/2825 (2013.01); C08G 18/485 (2013.01); C08G 18/4825 (2013.01); C08G 18/4837 (2013.01); C08G 18/711 (2013.01); C08G 18/755 (2013.01); C08G 18/7621 (2013.01); C08G 18/8064 (2013.01); C09D 5/14 (2013.01); C09D 7/43 (2018.01); C08G 18/7806 (2013.01)

(58) Field of Classification Search
CPC ............ C08G 18/7621; C08G 18/7806; C08G 18/8064; C08G 18/10; C08G 18/4825; C08G 18/4837; C08G 18/485; C08G 18/711
See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 4,314,924 A | * 2/1982 | Haubennestel ... | C07C 273/1827 524/173 |
| 4,794,147 A | 12/1988 | Savino et al. | |

(Continued)

FOREIGN PATENT DOCUMENTS

| | | |
|---|---|---|
| CA | 2352660 C | 10/2008 |
| CN | 1840587 A | 10/2006 |
| CN | 101089026 A | 12/2007 |
| CN | 102093532 A | 6/2011 |

(Continued)

OTHER PUBLICATIONS

Jun et al., "Synthesis and Properties of Hydrophobically-Modified Ethoxylated Urethane Associative Thickeners," Paint & Coatings Industry, vol. 45, No. 1, Jan. 2015 (translation).
International Search Report and Written Opinion for International Application No. PCT/EP2018/059394 dated Jun. 8, 2018.

Primary Examiner — Michael L Leonard
(74) Attorney, Agent, or Firm — Fitch, Even, Tabin & Flannery, L.L.P.

(57) ABSTRACT

The invention relates to polymer comprising structural units according to formula (I), $R^1$—X—(C=O)—NH—$R^2$—NH—(C=O)—O—POA-$R^3$—(O—POA-$R^4$)$_n$ wherein $R^1$ represents an organic group terminated by a hydrocarbyl group having 6 to 50 carbon atoms, X represents O or N—$R^5$, wherein $R^5$ represents a hydrogen atom or a hydrocarbyl group having 1 to 30 carbon atoms, $R^2$ represents a hydrocarbyl group comprising an aromatic group and having 6 to 40 carbon atoms, POA represents a polyoxyalkylene group, $R^3$ represents an organic group having 2 to 40 carbon atoms, n is an integer from 1 to 6, $R^4$ is independently selected from —(C=O)—NH—$R^2$—NH—(C=O)—NH—$R^1$, —$R^6$, wherein $R^6$ represents a hydrogen atom or an aliphatic or aromatic group having 1 to 24 carbon atoms, and wherein the polymer has an average of at least 1.8 end groups $R^1$ per molecule, a number average molecular weight in the range of 2000 to 100000 Daltons, and a polydispersity in the range of 1.0 to 5.0, wherein the quotient of the polydispersity divided by (n+1) is less than 1.0.

14 Claims, No Drawings

(56) References Cited

U.S. PATENT DOCUMENTS

| | | | |
|---|---|---|---|
| 5,175,229 A | 12/1992 | Braatz et al. | |
| 5,916,967 A * | 6/1999 | Jones | C11D 17/003 |
| | | | 524/732 |
| 5,977,398 A | 11/1999 | Komiya | |
| 6,440,431 B1 | 8/2002 | Yoshida et al. | |
| 2003/0065088 A1 | 4/2003 | Wamprecht et al. | |
| 2004/0007153 A1 | 1/2004 | Thetford et al. | |
| 2005/0159575 A1 * | 7/2005 | Rische | C08G 18/0828 |
| | | | 528/44 |
| 2007/0161745 A1 | 7/2007 | Coutelle et al. | |
| 2012/0029146 A1 * | 2/2012 | Matsui | C08G 18/755 |
| | | | 524/591 |

FOREIGN PATENT DOCUMENTS

| | | |
|---|---|---|
| CN | 103210005 A | 7/2013 |
| CN | 103517930 A | 1/2014 |
| CN | 103992462 A | 8/2014 |
| CN | 104558502 A | 4/2015 |
| CN | 103328524 A | 11/2015 |
| CN | 105579509 A | 5/2016 |
| CN | 104704064 B | 12/2017 |
| CN | 106488939 B | 4/2019 |
| CN | 102532459 A | 7/2021 |
| EP | 0309810 A3 | 9/1988 |
| EP | 1188779 B1 | 6/2004 |
| JP | 06206960 A | 7/1994 |
| JP | H0967563 A | 3/1997 |
| JP | 2000239120 A | 9/2000 |
| JP | 2005232457 A | 9/2005 |
| JP | 2007063487 A | 3/2007 |
| JP | 2020516732 A | 6/2020 |
| JP | 2020516733 A | 6/2020 |
| WO | 201604357 A1 | 1/2016 |

\* cited by examiner

POLYMER SUITABLE AS A THICKENER

The invention relates to a modified urethane polymer, a process for preparing the polymer, to the use of the polymer as thickening agent in an aqueous liquid composition, and to a composition comprising the polymer and a continuous aqueous liquid phase.

Hydrophobically modified ethoxylated urethanes, abbreviated as HEUR, and their use as thickeners are known in the art. HEUR thickeners are typically prepared in a random polymerization process wherein a diisocyanate is reacted with polyethylene glycol and optionally branching agents, and a hydrophobic monoalcohol, which terminates the polymer chain. Such processes are described in U.S. Pat. No. 4,079,028. The random nature of the reaction of the isocyanate with the polyols leads to polymers with a broad molecular weight distribution.

It has been found that the known HEUR thickeners, when applied in aqueous coating compositions, lead to coating compositions which are not fully satisfactory in terms of substrate wetting, hiding properties, and flow properties.

The invention seeks to provide thickeners which alleviate or eliminate the above-mentioned drawbacks.

It should be noted that U.S. Pat. No. 4,794,147 describes the reaction of 2,4-toluylene diisocyanate and methyl terminated polyethylene glycol under mild conditions to produce primarily the mono-adduct at the 4-position. The mono-adduct is then allowed to react with diethanolamine to produce a diol that can be incorporated into a urethane coating resin to provide in-situ nonionic stabilization.

U.S. Pat. No. 517,522 describes reaction products of isophorone diisocyanate and branched polyalkylene oxides to prepare self-crosslinking gels for biomedical applications. In this case, the inventors used one mole of diisocyanate to one mole of hydroxyl functionality. The resultant polymers gel aqueous systems by reacting with water.

The invention provides a polymer comprising structural units according to formula (I),

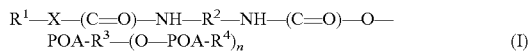

$$R^1\text{—}X\text{—}(C\text{=}O)\text{—}NH\text{—}R^2\text{—}NH\text{—}(C\text{=}O)\text{—}O\text{—}POA\text{-}R^3\text{—}(O\text{—}POA\text{-}R^4)_n \quad (I)$$

wherein
$R^1$ is independently selected from organic groups terminated by a hydrocarbyl group having 6 to 50 carbon atoms,
X is independently selected from O or $NR^5$, wherein $R^5$ represents a hydrogen atom or an aliphatic or aromatic group having 1 to 30 carbon atoms,
$R^2$ is independently selected from hydrocarbyl groups comprising an aromatic group and having 6 to 40 carbon atoms,
POA represents a polyoxyalkylene group
$R^3$ is independently selected from organic groups having 2 to 12 carbon atoms,
n is an integer from 1 to 6
$R^4$ is independently selected from
—(C=O)—NH—$R^2$—NH—(C=O)—X—$R^1$,
—(C=O)—NH—$R^1$,
—$R^6$, wherein $R^6$ represents a hydrogen atom or an aliphatic or aromatic group having 1 to 24 carbon atoms,
and wherein the polymer has an average of at least 1.8 end groups $R^1$ per molecule, a number average molecular weight in the range of 2000 to 100.000 Daltons, and a polydispersity in the range of 1.0 to 5.0, wherein the quotient of the polydispersity divided by (n+1) is less than 1.0.

In a preferred embodiment, the polymer has a content of the structural units according to formula (I) of at least 70% by weight, calculated on the total mass of the polymer.

The polymer of the invention can be used with great advantage as thickener, in particular as thickener in aqueous liquid compositions, for example in aqueous coating compositions. When applied as thickener in aqueous coating compositions, the polymer of the invention leads to coating composition which exhibits improvements in terms of substrate wetting, hiding properties, and flow properties.

Associative thickeners are usually supplied as aqueous solutions at 15-25% by weight thickener content. It is preferred that the solutions contain a higher thickener content and a lower amount of water, because a lower amount of water in the additive allows for greater formulating latitude in the thickened product, such as a paint. Many thickeners using the polymer of the current invention can be dissolved at higher concentrations without the use of materials that suppress the viscosity. It is preferred to avoid such suppressants since they can affect the properties of the final product.

It should be noted that the various groups in the polymer according to formula (I) defined above can be selected independent of each other. If the polymer comprises two or more groups of the same definition, these groups are likewise selected independently, as long as they fall within the definition provided for that group.

$R^1$ represents an organic group terminated by a hydrocarbyl group having 6 to 50 carbon atoms. The hydrocarbyl group may be aliphatic, aromatic, or alkyl aromatic. The hydrocarbyl group may be branched or unbranched, and may be saturated or unsaturated. Examples of suitable hydrocarbyl groups include branched or linear alkyl groups having 7 to 30 carbon atoms, in particular 8 to 22 carbon atoms. Preferred alkyl groups include linear and branched alkyl groups having 8 to 18 carbon atoms; in a special embodiment, branched alkyl groups are preferred. A further suitable hydrocarbyl group is a tristyrylphenyl group, in particular a 2,4,6-tri(1-phenylethyl)phenyl group.

In one embodiment, $R^1$ consists of the terminal hydrocarbyl group as defined above. In that case, at least one $R^1$ represents a hydrocarbyl group having 6 to 30 carbon atoms. If the polymer comprises more than one $R^1$, the individual $R^1$ may be the same or different. In a further embodiment, $R^1$ represents a polyoxyalkylene group which is terminated by a hydrocarbyl group as defined above. Examples of suitable types of polyoxyalkylene groups include polymers of ethylene oxide, propylene oxide and butylene oxide. In addition to polymers based on these and other mono-functional epoxides, polymers based on oxetanes and tetrahydrofuran may be used, as well as copolymers and block copolymers thereof. In a still further embodiment, $R^1$ represents a polyester group terminated by a hydrocarbyl group having 6 to 30 carbon atoms. Specific examples of suitable polyester groups include polymers and oligomers obtained by ring opening polymerization of epsilon caprolactone and gamma butyrolactone. In a further embodiment, $R^1$ comprises a combination of polyether and polyester segments, for example blocks of polyether and polyester, and is terminated by a hydrocarbyl group as defined above. In a preferred embodiment, $R^1$ represents a polyoxyalkylene group consisting of ethylene oxide and propylene oxide based units which is terminated by a hydrocarbyl group having 8 to 30 carbon atoms. In a very preferred embodiment, $R^1$ represents a polyethyleneoxide group which is terminated by a alkyl group having 8 to 18 carbon atoms or by a tristyrylphenyl group.

In a preferred embodiment, X in formula (I) represents an oxygen atom. Alternatively, X represents an N—$R^5$ group, wherein $R^5$ represents a hydrogen atom or hydrocarbyl group having 1 to 30 carbon atoms. The hydrocarbyl group may be branched or unbranched, and may be saturated or unsaturated. Examples of suitable hydrocarbyl groups include branched or linear alkyl groups having 1 to 10 carbon atoms, for example lower alkyl groups having 1 to 6 carbon atoms.

$R^2$ in formula 1 represents a hydrocarbyl group comprising an aromatic group and having 6 to 40 carbon atoms. Examples of specific suitable $R^2$ groups are the following structures, wherein the asterisk represents the positions where $R^2$ is linked to the remainder of the molecule:

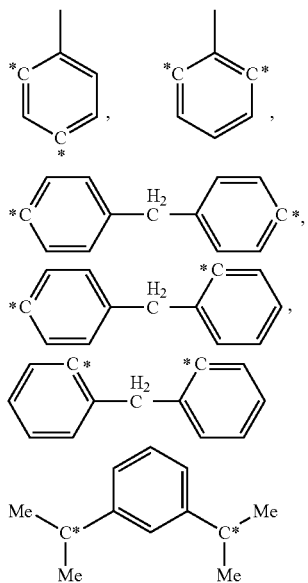

POA in formula (I) represents a polyoxyalkylene group. Examples of suitable types of polyoxyalkylene groups include polymers of ethylene oxide, propylene oxide and butylene oxide. In addition to polymers based on epoxides, polymers based on oxetanes and tetrahydrofuran may be used, as well as copolymers and block copolymers thereof. In a preferred embodiment, the polyoxyalkylene group comprises repeating units selected from ethylene oxide based units —[$C_2H_4$—O]— and propylene oxide based units —[$C_3H_6$—O]—.

It is particularly preferred that the amount of ethylene oxide based repeating units in relation to the total amount of ethylene oxide and propylene oxide based repeating units is higher than 65 wt. %, preferably higher than 75 wt. %. In a special embodiment, the polyoxyalkylene groups are ethylene oxide based repeating units only.

The polyoxyalkylene groups identified by POA together generally comprise at least a total of 50 ether oxygen atoms, preferably at least 100 or 130 ether oxygen atoms, and more preferred at least 150 ether oxygen atoms. The polyoxyalkylene groups identified by POA together generally comprise at most a total of 1500 ether oxygen atoms, preferably at most 1200, and more preferably at most 1000 ether oxygen atoms.

$R^3$ in formula (I) represents an organic group having 2 to 40 carbon atoms. In many embodiments wherein the polymer of the invention is an essentially linear unbranched polymer, $R^3$ is an alkylene group having 2 to 4 carbon atoms, for example an ethylene or propylene group. In other embodiments, the polyoxyalkylene group may be branched. In this case $R^3$ represents the hydrocarbon residue of a multifunctional alcohol, such as glycerol, trimethylol propane, pentaerythritol, ditrimethylol propane, or dipentaerythritol. However, $R^3$ may also comprise other groups, for example groups derived from a polyisocyanate.

n in formula (I) represents an integer from 1 to 6. If n is 1, the polymer is a linear polymer. In some embodiments it is preferred that the polymer of the invention is essentially linear. For specific applications a branched polymer can be beneficial. In some embodiments, the polymer contains a mixture of structures having varying degrees of branching. For example a mixture wherein molecules wherein n is 1, 2 and 3 are present.

$R^4$ in formula (I) is independently selected from
—(C=O)—NH—$R^2$—NH—(C=O)—X—$R^1$,
—(C=O)—NH—$R^1$,
—$R^6$, wherein $R^6$ represents a hydrogen atom or an aliphatic or aromatic group having 1 to 24 carbon atoms.

In embodiments wherein $R^4$ is —(C=O)—NH—$R^2$—NH—(C=O)—X—$R^1$, the structure of the end group is similar to the structure of defined above for the other terminus of the polymer. In some cases, this embodiment is preferred.

In other embodiments $R^4$ represents —(C=O)—NH—$R^1$. This structure can be described as the reaction product of a hydroxyl terminated polyoxyalkylene group with an isocyanate of formula $R^1$—NCO.

In a still further embodiment, $R^4$ represents —$R^6$, wherein $R^6$ represents a hydrogen atom or an aliphatic or aromatic group having 1 to 24 carbon atoms. When $R^6$ is hydrogen, this structure can be described as a hydroxyl group which terminates a polyoxyalkylene group. When $R^6$ is an aliphatic or aromatic group having 1 to 24 carbon atoms, this structure can be described as an ether group which terminates polyoxyalkylene group. In some embodiments, $R^6$ is an aliphatic group having 1 to 5 carbon atoms. Examples of suitable examples of aliphatic groups include lower alkyl groups, such as methyl, ethyl and propyl and butyl groups. In a further embodiment, $R^6$ may be a lipophilic hydrocarbyl group having 6 to 18 carbon atoms.

In accordance with formula (I), the individual polymer molecules may comprise at least 1 end group $R^1$, and up to a maximum 7 end groups $R^1$ in embodiments wherein n is 6 and all $R^4$ groups comprise an $R^1$ group. Generally, the polymer consists of a mixture of different individual molecules, which may have different numbers of $R^1$ end groups. The average number of $R^1$ end groups of the polymer is defined as the total number of $R^1$ end groups divided by the number of polymer molecules. In accordance with the invention, the polymer has an average of at least 1.8 end groups $R^1$. Generally, the polymer has between 1.8 and 4.0 end groups $R^1$. In embodiments wherein the polymer is a linear polymer, the number of end groups $R^1$ is suitably in the range of 1.8 to 2.0.

The number average molecular weight of the polymer is in the range of 2000 to 100000 Daltons. In preferred embodiments, the number average molecular weight is in the range of 8000-50.000.

The molecular weight can suitably be determined by gel permeation chromatography (GPC), using polyethylene glycol as calibration standard and THF as eluent.

Furthermore, the polymer of the invention preferably has a content of the structural units according to formula (I) of at least 80% by weight, calculated on the total mass of the polymer.

The polydispersity is defined as the mass average molecular weight Mw divided by the number average molecular weight Mn. Mn and Mw can both be determined by GPC as described above.

It is generally preferred that the polydispersity is low, for example in the range of 1.0 to 5.0. Preferably, the polydispersity does not exceed 4.0, more preferably 2.5, 2.2, or even 2.0.

The invention also relates to a polymer according to formula (I), wherein the quotient of the polydispersity divided by (n+1) is preferably less than 0.9 or 0.8. For this quotient, n represents the integer n in formula (I).

The polymeric or oligomeric raw materials employed in the preparation of polymer of the invention already have a molecular weight distribution and a polydispersity.

In particular, the polymer according to formula (I) comprises polyoxyalkylene groups. In certain embodiments, the raw materials comprising polyoxyalkylene groups already have a relatively high polydispersity. As a consequence, the polydispersity of the polymer prepared from such raw materials may also exceed 5.0. If this occurs, the content of the structural units according to formula (I) should be at least 70% by weight, calculated on the total mass of the polymer. In some embodiments, the content of structural units according to formula (I) is at least 90% by weight, or even 95% by weight, or 100% by weight, calculated on the total mass of the polymer.

In a preferred embodiment, the polymer of the invention has a polydispersity in the range of 1.0 to 5.0, and a content of the structural units according to formula (I) of at least 70% by weight, calculated on the total mass of the polymer.

The invention also relates to a process for preparing the polymer according to formula (I). The process comprises reacting an isocyanate compound of formula (II)

$$R^1—X—(C=O)—NH—R^2—NCO \quad (II)$$

and a hydroxyl functional polyoxyalkylene group containing compound of formula (III)

$$HO—POA-R^3—(O—POA-R^4)_n \quad (III),$$

wherein $R^1$ to $R^4$, POA, X, and n are as explained above.

In a preferred embodiment, at least one $R^4$ group in formula (III) is a hydrogen atom. It is more preferred that all $R^4$ groups in formula (III) are hydrogen atoms.

Optionally, it is possible to include a further isocyanate of the formula $R^7—(NCO)_m$, wherein $R^7$ represents an organic group having 1 to 40 carbon atoms, and m is an integer from 1 to 10.

The reaction of the compounds of formula (II) and formula (III) is suitably carried out in a temperature range of 20 to 120° C., although temperatures outside of this range are possible, if so desired. A preferred temperature range is from 50 to 100° C., in particular 60 to 90° C. If desired, the reaction can be carried out in the presence of a catalyst for catalyzing the reaction between isocyanate groups and hydroxyl groups. Such catalysts are well-known in the art. The process can be carried out in the absence or in the presence of a solvent. In some embodiments it is preferred to carry out the process in the absence of a solvent. The process can be carried out as a batch process, or a as a semi-batch process.

In one embodiment, the process is carried out in a continuous manner wherein the compounds of formula (II) and (III) are continuously fed in to a reaction zone and passed through the reaction zone, and wherein the polymer of formula (I) is continuously removed from the reaction zone. The compounds of formula (II) and (III) may be fed into the reaction zone individually or as a pre-mix. A suitable apparatus for the continuous process includes an extruder or kneader, for example a twin-screw extruder, for example, a machine such as a CRP-63 or CRP-630 from LIST AG of Basel, Switzerland.

In a typical embodiment of the process, the compound of formula (II) is obtained by reacting a diisocyanate of formula OCN—$R^2$—NCO (IV) and a compound of formula $R^1$—XH (V). Suitable diisocyanates are those based on the hydrocarbyl groups $R^2$ described above. Examples of compounds of the formula $R^1$—XH (V) include alcohols (X is oxygen) and amines (X is N—$R^5$). Specific examples of compounds of the formula (V) include fatty alcohol ethoxylates terminated by a hydroxyl group.

It is preferred that the reaction of the diisocyanate of formula (IV) and the compound of formula (V) selectively provides a mono-adduct of formula (II). The content of di-adduct, wherein both isocyanates groups have been reacted with a compound of formula (V) and the content of unreacted diisocyanate are preferably low. Generally, the reaction product contains at least 80 mol-% of the compound of formula (II), preferably at least 90 mol-%, or even up to 95 or 99 mol-% or higher. In order to achieve a high content of mono-adduct it is preferred that the isocyanate groups of the diisocyanate of formula (IV) differ in reactivity towards the compound of formula (V). Examples of preferred diisocyanates are those of the formulae below:

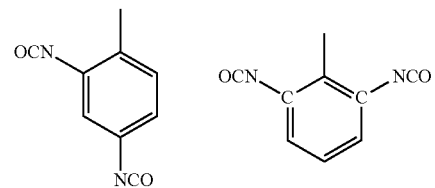

and mixtures thereof. With these diisocyanates of high selectivity the mono-adduct can be achieved, even if a low or no molar excess of diisocyanate over the compound of formula (V) is employed. A molar excess of diisocyanate can likewise be used. Generally, a molar excess of diisocyanate over the compound of formula (V) increases the yield of the mono-adduct. The molar ratio of the compound of formula (V) and diisocyanate generally ranges from 1:8 to 1:1, preferably from 1:4 to 1:1, and more preferably from 1:2.5 to 1:1. In embodiments wherein a molar excess of diisocyanate is employed in the reaction, the excess of diisocyanate is suitably removed after completion of the reaction, for example by distillation.

A high content of mono-adduct of formula (II), and a low content of di-adduct and unreacted diisocyanate leads to polymers of formula (I) having the desired low polydispersity, or to a low increase of polydispersity of the polymer, as compared to the polydispersity of the polyoxyalkylene group-containing starting materials. Generally, the polydispersity of the polymer of formula (I) is 0 to 15% higher than the polydispersity of the polyoxyalkylene group-containing starting materials, preferably 0 to 10% higher.

A polymer fulfilling the above requirements, also the requirement that the content of the structural units according to formula (I) of is at least 70% by weight, calculated on the total mass of the polymer, can be obtained when it is prepared in a process wherein the amount of isocyanates having two or more isocyanate groups employed in the reaction does not exceed 30% by weight, calculated on the total amount of isocyanate-functional raw materials used in the process. It is generally preferred that the amount of isocyanates having two or more isocyanate groups is as low as possible, for example at most 20% by weight, or at most 10% by weight, or at most 5% by weight, calculated on the total amount of isocyanate-functional raw materials used in the process.

The polymers of the invention can be used with great advantage as thickeners in liquid aqueous compositions.

Aqueous compositions are those in which the main or only liquid diluent used is water. Preferably, aqueous systems contain less than 35% by weight, 25% by weight, 20% by weight or even less than 10% by weight of (volatile) organic solvents, based on the total weight of water and organic solvent in the liquid formulation. In some embodiments, aqueous systems are free of organic solvents. Aqueous systems may contain water-soluble organic or inorganic compounds, e.g., ionic compounds like salts.

The use generally comprises adding the polymer to an aqueous liquid composition and increasing/controlling the viscosity of the aqueous liquid composition. Examples of suitable aqueous liquid compositions include a coating composition, a (pre-)polymer composition, a pigment concentrate, a ceramic product, a sealant, a cosmetic preparation, an adhesive, a casting compound, a lubricant, an ink, a cleaning agent, a liquid for use in gas- or oil production, a putty, a metal working fluid, a sprayable liquid, like deposition aids used for crop protection, a wax emulsion, a liquid for use in energy storage media like batteries, a liquid for use in electric or electronic components, a casting or potting composition, and a building material.

The invention further relates to a composition comprising
a) a continuous aqueous liquid phase,
b) the polymer according to formula (I) dissolved in the continuous aqueous liquid phase, and
c) a hydrophobic component dispersed in the continuous aqueous liquid phase.

The continuous aqueous liquid phase contains water and is liquid at a temperature of 20° C. The hydrophobic component may be an organic component, for example an organic compound or an organic polymer, such a as a film-forming binder. Alternatively, the hydrophobic component may be inorganic component having hydrophobic properties. In some embodiments, different organic and/or inorganic components are present in combination as component (c) of the composition.

In a very preferred embodiment, the hydrophobic component is a film-forming polymeric binder.

In one embodiment, the composition further comprises solid particles. Examples of solid particles include pigments, fillers, and combinations thereof. The composition may comprise other ingredients and additives commonly used in aqueous compositions, for example organic co-solvents, crosslinkers, anti-foaming agents, dispersing aids, and UV stabilizers. Although the polymer according to the invention provides excellent thickening properties, it is possible to use the polymer of the invention in combination with other rheology control agents, if so desired. Examples of other rheology control agents include clay based thickeners, polysaccharides (like cellulose derivatives, guar, xanthan), urea compounds, (poly)amides, polyacrylates (like alkali soluble or swellable emulsions), or associative thickeners (like polyurethane thickeners, aminoplast based thickeners, hydrophobically modified alkali soluble emulsion type thickeners). In a particular example, the polymer of the invention can be used in combination with other associative thickeners affecting the low, medium, and/or high shear performance of the liquid aqueous composition that needs to be modified concerning its rheological behavior.

Generally, the polymer of the invention is present in the aqueous liquid compositions in an amount of at least 0.1% by weight, for example 0.2 or 0.3% by weight, or preferably at least 0.5% by weight, calculated on the total weight of the composition.

Generally, the polymer of the invention is present in the aqueous liquid compositions in an amount of at most 7.0% by weight, for example 5.0 or 4.0% by weight, or preferably at most 3.0% by weight, calculated on the total weight of the composition.

The aqueous compositions which are coating compositions or inks can be used in various application fields, like automotive coatings, construction coatings, protective coatings (like marine or bridge coatings), can and coil coatings, wood and furniture coatings, industrial coatings, plastics coatings, wire enamels, foods and seeds coatings, leather coatings (both for natural and artificial leather), color resists (as used for LC displays). Coating materials include pasty materials which typically have a high content of solids and a low content of liquid components, e.g., pigment pastes or effect pigment pastes (using pigments based on aluminum, silver, brass, zinc, copper, bronzes like gold bronze, iron oxide-aluminum); other examples of effect pigments are interference pigments and pearlescent pigments like metal oxide-mica pigments, bismuth oxide chloride or basic lead carbonate.

The (pre)polymer compositions mentioned are aqueous liquid starting materials for the manufacturing of plastic compounds, which are preferably cured by a chemical crosslinking process.

The cosmetic compositions can be all kind of aqueous liquid compositions used for personal care and health care purpose. Examples are lotions, creams, pastes like toothpaste, foams like shaving foam, gels like shaving gel and shower gel, pharmaceutical compounds in gel like delivery form, hair shampoo, liquid soap, nail varnish, lipstick, and hair tinting lotions.

Preferred wax emulsions are aqueous dispersions of wax particles formed of waxes which are solid at room temperature.

Spraying agents (preferably used as deposition aids) can be equipped with the inventive polymers in order to achieve drift reduction. They may for example contain fertilizers or herbicides, fungicides, and other pesticides.

The formulations used for construction purpose can be materials which are liquid or pasty during handling and processing; these aqueous materials are used in the construction industry and they become solid after setting time, e.g., hydraulic binders like concrete, cement, mortar/plaster, tile adhesives, and gypsum.

Metal working fluids are aqueous compositions used for the treatment of metal and metal parts. Examples are cutting fluids, drilling fluids (used for metal drilling), mold release agents (mostly aqueous emulsions, e.g., in aluminum die casting and foundry applications), foundry washes, foundry coatings, as well as liquids used for the surface treatment of metals (like surface finishing, surface cleaning and galvanization).

Lubricants are aqueous compounds used for lubricating purpose, i.e., used to reduce abrasion and friction loss or to improve cooling, force transmission, vibration damping, sealing effects, and corrosion protection.

Liquid formulations used for gas and oil production are aqueous formulations used to develop and exploit a deposit.

Aqueous drilling fluids or "drilling muds" are preferred examples. An application example is hydraulic fracturing.

Cleaners can be used for cleaning different kinds of objects. They support the removal of contaminations, residual dirt and attached debris. Cleaners also include detergents (especially for cleaning textiles, their precursors and leather), cleansers and polishes, laundry formulations, fabric softeners, and personal care products.

The adhesives can be all kind of aqueous materials which are liquid under processing conditions and which can join joining parts by promoting surface adhesion and internal strength.

The inventive polymers can be delivered as a solid additive material, e.g., as flakes, pellets, granules. In this case, it is very preferred that at least 70 wt. %, 80 wt. %, 95 wt. % or even 100 wt. % of the solid material consist of the inventive polymer of formula (I).

Alternatively, the polymers can be provided as an aqueous additive composition.

The invention further relates to an additive composition comprising a) 10.0 to 60.0% by weight of the polymer according to the invention, b) 40.0 to 90.0% by weight of water, c) 0.0 to 1.0% by weight of a biocide, and d) 0.0 to 75.0% by weight of a viscosity depressant.

The weight percent relate to the relative ratio of the components a) to d) in the additive composition.

Examples of suitable viscosity depressants include polyalkylenoxides, particularly those based on ethylene oxide, propylene oxides, and mixtures thereof, butyldiglycol, cyclodextrins, and alkyl polyglycosides. Further examples of viscosity depressants are described in US 2007/161745. The viscosity depressant is an optional component of the additive composition of the invention. If present, the additive composition generally comprises at most 75.0% by weight of viscosity depressant, preferably at most 60.0 or 55.0% by weight, calculated on the sum of the components a) to d). In some embodiments, the amount of viscosity depressant can be below 10.0% by weight, for example between 2.0 and 4.0% by weight, calculated on the sum of the components a) to d). In yet another embodiment, no depressant is used at all.

EXAMPLES

Preparation of starting materials, polymers according to the invention, and comparative polymers Molecular weights and molecular weight distributions were determined using gel permeation chromatography (GPC) according to DIN 55672 part 1 (2016-03). Tetrahydrofuran (THF) was used as the eluent. The calibration was achieved using narrowly distributed linear polyethylene glycol standards of molecular weights between 44,000 and 238 g/mol. The temperature of the column system was 40° C.

Description of raw materials used

| Trade designation | Chemical Description | Supplier |
| --- | --- | --- |
| Desmodur T 100 | 2,4-toluylene diisocyanate | COVESTRO |
| | benzoyl chloride | SIGMA-ALDRICH |
| | octadecyl alcohol | SIGMA-ALDRICH |
| | 2-ethylhexanol | SIGMA-ALDRICH |
| | 3,5,5-trimethyl hexanol | SIGMA-ALDRICH |
| Isalchem 125 | C12-C15 isomeric alcohols | SASOL |
| Polyether X | alkoxylated pentaerythritol with a 80/20 weight ratio of ethylene oxide and propylene oxide repeating units and a hydroxyl value of 16 mg KOH/g | |
| Polyglykol 12000 (PEG-12) | Polyglykol 12000 S - a polyethylene glycol with a mean molecular weight of 12000 | Clariant |
| Polyglykol 20000 (PEG-20) | Polyglykol 20000 S - a polyethylene glycol with a mean molecular weight of 20000 | Clariant |
| Polyglykol 35000 (PEG-35) | Polyglykol 35000 S - a polyethylene glycol with a mean molecular weight of 35000 | Clariant |
| K-KAT 348 | Bismuth carboxylate catalyst | KING Industries |

List of Abbreviations Used

TDI: 2,4-toluylene diisocyanate

PEG: polyethylene glycol

PDI: polydispersity index

Mn: number average molecular weight

Mw: weight average molecular weight

TMH: 3,5,5-trimethylhexanol

VS: volume solid

Preparation of mono-adducts of diisocyanates and mono-alcohols

Alcohols were reacted with a diisocyanate to form a mono-adduct according to the procedure described in EP 1188779. All mono-adducts were prepared in two steps comprising the synthesis and removal of excess diisocyanate by thin film evaporation TDI and benzoyl chloride were heated to 50-70° C. and the alcohol was added dropwise. The reaction mixture was stirred for 3-6 hours and the reaction conversion was controlled by the measurement of the isocyanate value.

Afterwards, the distillation of excess TDI was done via a thin-film evaporator at a temperature between 100° C. and 150° C. After this step, the mono-adducts contained less than 0.2% by weight of residual diisocyanate.

TABLE 1

Overview of mono-adducts

| Monoadduct no. | alcohol | isocyanate |
|---|---|---|
| MA-1 | octadecyl alcohol | TDI |
| MA-2 | 2-ethylhexanol | TDI |
| MA-3 | 3,5,5-trimethyl hexanol | TDI |
| MA-4 | C12-C15 isomeric alcohols | TDI |

Preparation of polymers according to the invention and comparative polymers

Examples According to the Invention

Urethane UR-1

In a four-neck round bottom flask equipped with stirrer, reflux condenser and nitrogen inlet, 99.92 g (7.1 mmol) of the polyether X were heated to 80° C. 13.00 g (0.0285 mol) of MA-1 were added. After 2.5 h at 80° C., 500 ppm of the bismuth carboxylate catalyst were added to the reaction mixture which was then reacted for another 2.5 h at 80° C. The reaction product is a highly viscous slightly brownish product.

Urethane UR-2

In a four-neck round bottom flask equipped with stirrer, reflux condenser and nitrogen inlet, 126.23 g (9 mmol) of the polyether X were heated to 80° C. 8.29 g (27 mmol) of MA-2 were added. The reaction mixture was reacted for 3 h at 80° C. The reaction product is a highly viscous yellowish product.

Urethane UR-3

In a four-neck round bottom flask equipped with stirrer, reflux condenser and nitrogen inlet, 121.32 g (8.7 mmol) of the polyether X were heated to 80° C. 5.77 g (17.3 mmol) of MA-3 were added. The reaction mixture was reacted for 3 h at 80° C. The reaction product is a highly viscous yellowish product.

Urethane UR-4

In a four-neck round bottom flask equipped with stirrer, reflux condenser and nitrogen inlet, 124.82 g (8.9 mmol) of the polyether X were heated to 80° C. 5.48 g (17.8 mmol) of MA-2 were added. The reaction mixture was reacted for 3 h at 80° C. The reaction product is a highly viscous yellowish product.

Comparative Example CE-1

In a four-neck round bottom flask equipped with stirrer, reflux condenser and nitrogen inlet, 98.18 g (7 mmol) of the polyether X and 7.57 g (0.028 mol) of octadecyl alcohol were heated to 80° C. Following this, 4.87 g (0.028 mol) of TDI were added slowly to the reaction mixture. During the course of the isocyanate addition, an increase of temperature and viscosity could be observed. Finally, the reaction was discontinued, since the stirring of the reaction product turned out to be impossible.

Comparative Example CE-2

In analogy to example CE-1, a conventional urethane thickener was prepared by reaction of polyether X and 1-isocyanatooctadecane.

Comparative Example CE-3

In a four-neck round bottom flask equipped with stirrer, reflux condenser and nitrogen inlet, 105.19 g (7.5 mmol) of polyether X were heated to 80° C. 2.16 g (15 mmol) of 3,5,5-trimethyl hexanol were added. After homogenization of this mixture, 2.61 g (15 mmol) of TDI were added and the reaction mixture was reacted for 3 h at 80° C. The reaction product is a highly viscous yellowish product.

Comparative Example CE-4

In analogy to example CE-3, a conventional urethane thickener was prepared by reaction of ethoxylated decanol and an aliphatic triisocyanate.

TABLE 2

Overview of polymers prepared

| Example | Monoadduct | Polyether | Alcohol | Mn [g/mol] | Mw [g/mol] | PDI | PDI/ (n + 1) |
|---|---|---|---|---|---|---|---|
| Polyether X | | | | 6592 | 14924 | 2.26 | |
| UR-1 | octadecyl alcohol | Polyether X | — | 5997 | 23764 | 3.96 | 0.99 |
| UR-2 | 2-ethylhexanol | Polyether X | — | 5418 | 17258 | 3.19 | 0.79 |
| UR-3 | 3,5,5-trimethylhexanol | Polyether X | — | 7142 | 21177 | 2.97 | 0.74 |
| UR-4 | 2-ethylhexanol | Polyether X | — | 6163 | 18699 | 3.03 | 0.76 |
| CE-3 | — | Polyether X | TMH | 7765 | 45465 | 5.86 | 1.47 |

Preparation of Further Polymers According to the Invention

Example X.1

A four-necked round-bottom flask equipped with stirrer, temperature probe, and reflux condenser was charged with 0.0503 moles (350.00 g) Polyglykol 12000 S and heated to 120° C. under vacuum with constant stirring. After three hours of drying time, the round-bottom flask was cooled to 70° C. and put under nitrogen. A solution of 0.0503 moles (16.75 grams) of MA-3 dissolved in toluene was added to the round-bottom flask. The reaction is exothermic and the solution was added slowly so that the temperature of the flask does not exceed 80° C. After the complete addition of the monoadduct the mixture was stirred for 3 hours at 70° C. under nitrogen. The finished product was poured onto a pan to allow the solvent to evaporate. The final product was broken into opaque white flakes which were subsequently dissolved into water for testing.

The same basic procedure was followed for examples X.2-X.9 with a 2:1 molar ratio of TDI-monoadduct and polyethylene glycol (PEG).

TABLE 3

List of polyethylene glycol (PEG) starting material and inventive polymers. The PEG is listed as an abbreviated form of the tradename: Polyglykol 12000 S (PEG-12), Polyglykol 20000 S (PEG-20) and Polyglykol 35000 S (PEG-35) available from Clariant. The molecular weights and polydispersity index (PDI) have been measured by GPC as described above.

| Example | TDI-monoadduct | TDI-monoadduct (mass) | Polyethylene glycol | Polyethylene glycol (mass) | Mn (g/mol) | Mw (g/mol) | PDI | PDI/(n + 1) |
|---|---|---|---|---|---|---|---|---|
|  |  |  | PEG-12 |  | 13832 | 16267 | 1.18 |  |
|  |  |  | PEG-20 |  | 19463 | 23322 | 1.20 |  |
|  |  |  | PEG-35 |  | 30242 | 40909 | 1.35 |  |
| X.1 | MA-3 | 16.75 g | PEG-12 | 350.00 g | 10630 | 16712 | 1.57 | 0.79 |
| X.2 | MA-3 | 12.14 g | PEG-20 | 350.00 g | 19610 | 26221 | 1.33 | 0.67 |
| X.3 | MA-3 | 6.66 g | PEG-35 | 350.00 g | 31863 | 45712 | 1.43 | 0.72 |
| X.4 | MA-2 | 15.54 g | PEG-12 | 350.00 g | 13460 | 16876 | 1.25 | 0.63 |
| X.5 | MA-2 | 11.27 g | PEG-20 | 350.00 g | 20796 | 27805 | 1.34 | 0.67 |
| X.6 | MA-2 | 6.18 g | PEG-35 | 350.00 g | 30872 | 43385 | 1.41 | 0.71 |
| X.7 | MA-4 | 19.92 g | PEG-12 | 350.00 g | 13131 | 16578 | 1.26 | 0.63 |
| X.8 | MA-4 | 14.44 g | PEG-20 | 350.00 g | 20021 | 25643 | 1.28 | 0.64 |
| X.9 | MA-4 | 7.92 g | PEG-35 | 350.00 g | 29347 | 41676 | 1.42 | 0.71 |

Preparation of Further Comparative Polymers

Comparative Example C.1

A four-necked round-bottom flask equipped with stirrer, temperature probe, and reflux condenser was charged with 0.0250 moles (500.00 g) Polyglykol 20000 S and heated to 120° C. under vacuum with constant stirring. After three hours of drying time, the round-bottom flask was cooled to 70° C. and put under nitrogen. A combination of 0.500 moles of toluene diisocyanate (8.71 grams), 0.500 moles of 3,5,5-trimethylhexanol (7.21 g) and 0.67 grams of a bismuth carboxylate catalyst was added to the round-bottom flask. The reaction is exothermic and the solution was added slowly so that the temperature of the flask did not exceed 80° C. After the complete addition of the reactants the mixture was stirred for 1.5 hours at 70° C. under nitrogen. The finished product was poured onto a pan to allow any solvent to evaporate. The following data were determined: Mn 25550, Mw 54230, PDI 2.12, PDI/(n+1) 1.06. The final product was broken into opaque white flakes which were subsequently dissolved into water for further testing.

Comparative Example C.2

A four-necked round-bottom flask equipped with stirrer, temperature probe, and reflux condenser was charged with 0.0143 moles (500.00 g) Polyglykol 35000 S and heated to 120° C. under vacuum with constant stirring. After three hours of drying time, the round-bottom flask was cooled to 70° C. and put under nitrogen. A combination of 0.286 moles of toluene diisocyanate (4.98 grams), 0.286 moles of 3,5,5-trimethylhexanol (4.12 g) and 0.66 grams of a bismuth carboxylate catalyst was added to the round-bottom flask. The reaction is exothermic and the solution was added slowly so that the temperature of the flask does not exceed 80° C. After the complete addition of the reactants the mixture was stirred for 1.5 hours at 70° C. under nitrogen. The finished product was poured onto a pan to allow any solvent to evaporate. The following data were determined: Mn 36160, Mw 87540, PDI 2.42, PDI/(n+1) 1.21. The final product was broken into opaque white flakes which were subsequently dissolved into water for further testing.

Comparative Example C.3

A conventional urethane thickener was prepared by reaction of polyethylene glycol, diisocyanate and branched mono-functional alcohols. The following data were determined: Mn 24350, Mw 66830, PDI 2.74, PDI/(n+1) 1.37.

Preparation of an Additive Composition

The polyurethanes UR-1 and CE-2 were dissolved in the following formulations to form an aqueous additive compositions.

| Component | Description | concentration [wt. %] |
|---|---|---|
| UR-1/CE-2 | polyurethane | 20.00 |
| Viscosity depressant 1 | nonionic surfactant based on block copolymer of propylene oxide and ethylene oxide with 30% ethylene oxide | 12.75 |
| Viscosity depressant 2 | C8C14-alkylpolyglucoside | 7.50 |
| Water |  | 59.45 |
| Acticide MBS (Biocide) | 1,2-benzisothiazolin-3-one & 2-methyl-4-isothiazolin-3-one | 0.30 |

Preparation of a Paint Formulation

A high gloss acrylic emulsion paint was prepared from the following components using a Dispermat CV (VMA Getzmann):

| Raw Materials |  | wt. % |
|---|---|---|
| Water |  | 4.00 |
| Acticide MBS | THOR GmbH, Speyer, Germany | 0.20 |
| DISPERBYK-199 | BYK Additives, Wesel, Germany | 1.10 |
| BYK-1640 | BYK Additives, Wesel, Germany | 0.30 |
| Kronos 2190 | KRONOS Titan GmbH, Leverkusen, Germany | 22.50 |
| Water |  | 0.50 |
| BYK-7420 ES | BYK Additives, Wesel, Germany | 0.30 |
| Water |  | 5.00 |
| Dispersing with Dispermat CV for 20 minutes at 12 m/s |  |  |
| Acronal DS 6262 | BASF SE, Ludwigshafen, Germany | 57.00 |
| Texanol | Eastman Chemical Company, Kingsport, USA | 1.50 |

-continued

| Raw Materials | | wt. % |
|---|---|---|
| BYK-093 | BYK Additives, Wesel, Germany | 0.30 |
| Additive composition post add | Additive compositions of polymers UR-1 or CE-2 | 0.75 |
| Water | | 6.55 |
| Total | | 100.00 |

| Component | Function | Technical Description | Source |
|---|---|---|---|
| Acronal DS 6262 | Binder | Acrylic Polymer | BASF SE Ludwigshafen, Germany |
| Kronos 2190 | Pigment | Titanium Dioxide | KRONOS Titan GmbH Leverkusen, Germany |
| Texanol | Coalescent | Ester Alcohol | Eastman Chemical Company Kingsport, Tennessee, USA |
| DISPERBYK-199 | Dispersant | Solution of a copolymer with pigment affinic groups | BYK Additives & Instruments Wesel, Germany |
| BYK-1640 | Defoamer | Defoamer formulation made of polyamide particles & highly branched polymers | BYK Additives & Instruments Wesel, Germany |
| BYK-093 | Defoamer | Mixture of foam-destroying polysiloxanes and hydrophobic solids in polyglycol | BYK Additives & Instruments Wesel, Germany |
| BYK-7420 ES | Rheology Modifier | solution of a modified urea | BYK Additives & Instruments Wesel, Germany |
| Acticide MBS | biocide and algicide & fungicide | 1,2-benzisothiazolin-3-one & 2-methyl-4-isothiazolin-3-one | THOR GmbH Speyer, Germany |

Incorporation of Additive Compositions:

The additive compositions are post added under stirring and well incorporated for 5 minutes.

Evaluation of Application Properties:

Color acceptance: 97 wt. % of the paint sample and 3 wt. % of a blue pigment concentrate are mixed by hand. A 150 μm drawdown is carried out directly after mixing and after 1-5 days on BYK-Gardener contrast Chart 2811 (each series same day), rub-out is done after approx. 12 minutes.

The L*, a*, b* and ΔE values are measured by BYK-Gardner Color Guide sphere.

The target of the ΔE value is to be low.

Conclusion:

The results in the table below show improved ΔE values with the inventive chemistry in comparison to CE-2 without negative influence on other properties, such as gloss and visual appearance.

| Sample | ΔE value | |
|---|---|---|
| CE-2 | 5.4 | comparison |
| UR-1 | 1.5 | inventive polymer |

Preparation of Further Additive Compositions

The polyurethanes UR-2 to UR-4, CE-3 and CE-4 were dissolved in the following formulation to form aqueous solutions.

| Component | Description | concentration [wt. %] |
|---|---|---|
| UR-2/UR-3/UR-4/CE-3/CE-4 | polyurethane | 25 |
| Viscosity depressant 3 | isotridecyl ethoxylate | 40 |
| Viscosity depressant 4 | bisphenol-A-ethoxylate | 10 |
| Water | | 25 |

Preparation of a Paint Formulation

A high gloss acrylic emulsion paint was prepared from the following components:

| Raw Materials | | wt. % |
|---|---|---|
| Grind | | |
| Water | | 4.00 |
| Acticide MBS | THOR GmbH, Speyer, Germany | 0.20 |
| BYK-1640 | BYK Additives, Wesel, Germany | 0.20 |
| DISPERBYK-199 | BYK Additives, Wesel, Germany | 0.90 |
| Kronos 2310 | KRONOS Titan GmbH, Leverkusen, Germany | 18.75 |
| Water | | 0.50 |
| BYK-7420 ES | BYK Additives, Wesel, Germany | 0.25 |
| Water | | 3.45 |
| Dispersing with Dispermat CV for 20 minutes at 12 m/s | | |
| Letdown | | |
| Alberdingk AC 2025 | Alberdingk Boley Inc., Greensboro, USA | 59.00 |
| Propylene Glycol | | 3.00 |
| Water | | 3.65 |
| Aquacer 539 | BYK Additives, Wesel, Germany | 4.00 |
| Additive composition post add | Aqueous solutions of UR-2/UR-3/UR-4/CE-3/CE-4 | 1.50 |
| BYK-093 | BYK Additives, Wesel, Germany | 0.30 |
| BYK-349 | BYK Additives, Wesel, Germany | 0.30 |
| Total | | 100.00 |

| Component | Function | Technical Description | Source |
|---|---|---|---|
| AC 2025 | Binder | Acrylic Polymer | Alberdingk Boley Greensboro, USA |
| Kronos 2310 | Pigment | Titanium Dioxide | KRONOS Titan GmbH Leverkusen, Germany |
| AQUACER-539 | Wax | Non-ionic emulsion of modified paraffin wax | BYK Additives & Instruments Wesel, Germany |
| DISPERBYK-199 | Dispersant | Solution of a copolymer with pigment affinic groups | BYK Additives & Instruments Wesel, Germany |

| Component | Function | Technical Description | Source |
|---|---|---|---|
| BYK-1640 | Defoamer | Defoamer formulation made of polyamide particles & highly branched polymers | BYK Additives & Instruments Wesel, Germany |
| BYK-093 | Defoamer | Mixture of foam-destroying polysiloxanes and hydrophobic solids in polyglycol | BYK Additives & Instruments Wesel, Germany |
| BYK-349 | Silicone surfactant | Polyether-modified siloxane | BYK Additives & Instruments Wesel, Germany |
| BYK-7420 ES | Rheology Modifier | solution of a modified urea | BYK Additives & Instruments Wesel, Germany |
| Acticide MBS | Microbiocide and algicide & fungicide | 1,2-benzisothiazolin-3-one & 2-methyl-4-isothiazolin-3-one | THOR GmbH Speyer, Germany |

Incorporation of Additive Compositions:

The additive compositions were post added under stirring and well incorporated for 5 minutes using a Dispermat CV.

Evaluation:

Leveling bar: The leveling test blade is designed to comply with ASTM method D 4062 to measure the leveling properties of water and solvent based architectural coatings. The leveling blade creates parallel ridges to simulate brush marks. After the coating dries, the drawdown is evaluated by rating scale.

The leveling test bar is a cylinder rod with alternating gap clearances of 100 and 300 microns. Plastic side arms are a guide to maintain a straight blade movement.

The paint samples are applied by a Leneta leveling bar on BYK-Gardener contrast Chart 2811. For all paint samples, this application is carried out by the same speed and same person and therefore, all samples having the same film thickness, independent of the rheology of the sample.

Evaluation is done visually after drying.

Evaluation by rating scale: 1-5; 1=perfect leveling; 5=no leveling.

Brush ability: The samples are applied by brush (Wistoba 2040 06) on BYK-Gardener contrast Chart 2803 in an upright position (in consideration of film thickness differences between the paint samples due to the different rheology of the samples).

The visual evaluation of the ability to brush the samples (in terms of brush resistance and a similar feeling like a solvent borne alkyd paint) is done during the application.

Evaluation by rating scale: 1-5; 1=best; 5=worst.

Leveling brush application: Due to differences in film thickness, the leveling of the brush application needs to be evaluated (in comparison to leveling bar application where all samples are applied with the same film thickness). Evaluation is done visually after drying.

Evaluation by rating scale: 1-5; 1=perfect leveling; 5=no leveling.

Conclusion:

The results in the table below show an improved leveling and brush ability with the inventive polymers in comparison to CE-4 without negative influence on other properties, such as gloss and visual appearance. In comparison to CE-3, an improved brush ability is achieved by using the inventive polymers.

| Sample | Leveling bar | Leveling brush application | Brush ability | |
|---|---|---|---|---|
| CE-4 | 5 | 4.5 | 3 | comparison |
| UR-2 | 2.25 | 1.5 | 2 | inventive polymer |
| UR-3 | 1 | 1.5 | 1.75 | inventive polymer |
| UR-4 | 1 | 1.75 | 2.75 | inventive polymer |
| CE-3 | 1 | 3 | 3 | comparison |

Evaluation by rating scale: 1-5; 1=best; 5=worst.

Raw materials for preparation of further paint systems

TABLE 4

A list of materials in the SNAP 720 and SG-10AF paint systems.

| Component | Function | Technical Description | Manufacturer |
|---|---|---|---|
| SNAP 720 | Binder | Acrylic polymer. | Arkema Coating Resins; Colombes, France |
| Rhoplex SG-10AF | Binder | Acrylic polymer. | The DOW Chemical Company; Midland, Michigan, United States |
| Ti Pure R-900 | Pigment | Titanium dioxide. | The Chemours Company; Wilmington, Delaware, United States |
| Ropaque Ultra | Pigment | Ultra opaque polymer. | The DOW Chemical Company; Midland, Michigan, United States |
| Disperbyk 199 | Dispersant | A solution of a copolymer with pigment affinic groups. | BYK Additives & Instruments; Wesel, Germany |
| Tamol 731A | Dispersant | Hydrophobic copolymer polyelectrolyte. | The DOW Chemical Company; Midland, Michigan, United States |
| BYK 038 | Defoamer | Mixture of paraffinic mineral oils and hydrophobic components. | BYK Additives & Instruments; Wesel, Germany |
| Kathon LX | Microbicide | Aqueous solution of 5-chloro-2-methyl-4isothiazolin-3-one and 2-methyl-4-isothiazolin-3-one. | The DOW Chemical Company; Midland, Michigan, United States |

TABLE 4-continued

A list of materials in the SNAP 720 and SG-10AF paint systems.

| Component | Function | Technical Description | Manufacturer |
|---|---|---|---|
| Texanol | Coalescent | Ester Alcohol. | Eastman Chemical Company; Kingsport, Tennessee, United States |

SNAP 720 Latex Paint

TABLE 5

Recipe for the 40% volume solid (VS) paint based on SNAP 720. The amount of associative thickener and water in the final step is dependent on the desired wet level of the associative thickener.

| Component | 40% VS SNAP 720 system |
|---|---|
| Water | 2.92 wt % |
| Propylene glycol | 6.15 wt % |
| Disperbyk 199 | 1.22 wt % |
| BYK 038 | 0.19 wt % |
| Kathon LX | 0.17 wt % |
| Ti Pure R-900 | 23.93 wt % |
| Grind at 1,500 RPM for 30 minutes | |
| SNAP 720 | 52.22 wt % |
| Ropaque Ultra | 2.64 wt % |
| Texanol | 2.30 wt % |
| Mix at low speed for 30 minutes | |
| BYK 038 | 0.19 wt % |
| Water | variable wt % |
| Polymer of inventive and comparative examples | variable wt % |
| Mix at low speed for 30 minutes | |

TABLE 6

Application results of the X.2 and X.3 inventive polymers compared to comparative examples in a 40% volume solids SNAP 720 acrylic latex system (see Table 5 for recipe). The shear viscosities were measured 24 hours after the incorporation of the associative thickener.

| Sample | Concentration [g/L] of inventive and comparative additive examples | Brookfield [cP] | Stormer [KU] | ICI [P] | Sag [microns] |
|---|---|---|---|---|---|
| C.1 | 3.00 | 7,200 | 94.1 | 2.43 | 381 |
| C.1 | 4.19 | 13,000 | 104.2 | 3.27 | 483 |
| C.1 | 5.39 | 27,800 | 115.8 | 4.02 | 660 |
| C.2 | 3.00 | 5,800 | 83.8 | 2.05 | 274 |
| C.2 | 4.19 | 10,260 | 93.5 | 2.44 | 361 |
| C.2 | 5.39 | 20,000 | 102.6 | 2.50 | 483 |
| C.3 | 3.00 | 7,000 | 101.3 | 2.68 | 274 |
| C.3 | 4.19 | 10,600 | 109.2 | 3.10 | 351 |
| C.3 | 5.39 | 14,800 | 118.4 | 3.40 | 406 |
| X.2 | 3.00 | 11,600 | 104.7 | 2.53 | 381 |
| X.2 | 4.19 | 23,800 | 119.0 | 3.36 | 635 |
| X.2 | 5.39 | 50,200 | 131.7 | 3.99 | 889 |
| X.3 | 3.00 | 7,400 | 87.4 | 2.01 | 330 |
| X.3 | 4.19 | 21,400 | 102.6 | 2.60 | 533 |
| X.3 | 5.39 | 43,800 | 111.7 | 2.88 | 635 |

Acrysol SG-10AF Latex Paints

TABLE 7

Recipe for the 36% volume solid (VS) paint based on Rhoplex SG-10AF. The amount of associative thickener and water in the final step is dependent on the desired wet level of the associative thickener.

| Component | Percent for 36% VS SG-10AF system |
|---|---|
| Water | 6.64 wt % |
| Propylene glycol | 6.17 wt % |
| Tamol 731 | 1.22 wt % |
| BYK 038 | 0.09 wt % |
| Kathon LX | 0.17 wt % |
| Ti Pure R-900 | 24.00 wt % |
| Grind at 1,500 RPM for 30 minutes | |
| Water | 0.76 wt % |
| Rhoplex SG-10AF | 47.54 wt % |
| Ropaque Ultra | 2.65 wt % |
| Texanol | 2.31 wt % |
| Mix at low speed for 30 minutes | |
| BYK 038 | 0.09 wt % |
| Water | variable wt % |
| Polymer of inventive and comparative examples | variable wt % |
| Mix at low speed for 30 minutes | |

TABLE 8

Application results of the inventive polymer X.3 compared to comparative examples in a 36% volume solids SG-10AF acrylic latex system (see Table 7 for recipe). The samples were rolled out and the color difference (Delta-E) was measured as detailed above.

| Sample | Concentration [g/L] of inventive and comparative examples | Brookfield [cP] | Stormer [KU] | ICI [P] | Delta-E [avg] |
|---|---|---|---|---|---|
| C.1 | 3.00 | 4,200 | 71.6 | 1.804 | 3.6 |
| C.1 | 4.20 | 4,600 | 76.4 | 2.567 | 3.3 |
| C.1 | 5.40 | 6,400 | 81.8 | 2.852 | 3.0 |
| C.2 | 3.00 | 6,200 | 67.2 | 1.308 | 3.8 |
| C.2 | 4.20 | 14,400 | 75.8 | 1.887 | 3.5 |
| C.2 | 5.40 | 23,660 | 85.0 | 2.533 | 3.5 |
| C.3 | 3.00 | 15,400 | 80.3 | 1.367 | 4.5 |
| C.3 | 4.20 | 10,200 | 85.6 | 1.725 | 4.2 |
| C.3 | 5.40 | 7,600 | 89.4 | 2.308 | 4.4 |
| X.2 | 3.00 | 57,000 | 94.8 | 2.333 | 2.7 |
| X.2 | 4.20 | 50,400 | 100.2 | 3.062 | 2.4 |
| X.2 | 5.40 | 58,200 | 100.5 | 3.875 | 2.3 |
| X.3 | 3.00 | 4,580 | 67.0 | 1.137 | 3.1 |
| X.3 | 4.20 | 6,620 | 75.4 | 1.442 | 2.7 |
| X.3 | 5.40 | 9,200 | 81.8 | 2.217 | 2.6 |

Methods

Measurement of Rheology Properties in a Latex Paint

The shear viscosity of the latex paint was measured with ASTM International methodology. The Brookfield reported values were measured with a Brookfield DV-E Viscometer (BYK Additives & Instruments; Wesel, Germany) according to ASTM D2196-86 standard test method. The Stormer reported values were measured with a KU-1+ Viscometer (BYK Additives & Instruments; Wesel, Germany) according to the ASTM D562-81 standard test method. The ICI Cone/Plate CAP-1000+ Viscometer (Brookfield Engineering; Middleboro, Mass., United States) according to the ASTM D4287-83 standard test method. The dynamic viscosity units of poise (P) and centipoise (cP) convert to 0.1 and 0.001 Pascal-seconds.

Measurement of Sag Resistance

The sag resistance was measured according to ASTM D440-84. This standard test method utilizes a drawdown blade with a series of notches of successively higher clearance. The coating is applied to a test chart with the multi-notch applicator. The charts are immediately hung vertically with the drawdown strips horizontal. The sag is measured from the drawdown after the film has dried completely.

Rollout Procedure to Measure Color Difference/Hiding

The drywall was prepared with commercial white primer applied with a quarter inch nap roller. Afterwards, a 9 inch stripe of commercial paint tinted with 12 oz of black colorant per gallon was applied with a quarter inch nap roller in the middle of the drywall. The final test region was approximately 1 by 2 feet in an area including the black and white primer. The samples were applied with a wet roller in a cycle consisting of down and up across 2 feet of dry wall. A total of five cycles were applied and the paint was allowed to dry for a minimum of 24 hours. The color difference was measured with a BYK spectro-guide 45/0 instrument. The recorded differences (Delta-E) are of the dried paint samples on black primer all relative to the same control of white primer alone. Eight color difference measurements, each a further inch down from the center of the rollout on black primer, were combined into one average.

SNAP 720 Latex

Conclusion: Increased Low Shear Efficiency and Sag Resistance with Inventive Polymers The inventive polymers X.2 and X.3 have been compared in latex paint to polymers made in a random polymerization as described for comparative examples C.1, C.2 and C.3. As can be seen in Table 6, the inventive polymers are superior to the non-inventive comparative examples with respect to low shear efficiency and sag resistance. In each case the polymers were added to the paint at three different levels to a 40% VS paint based on SNAP 720. The inventive and comparative polymers impart equivalent high shear viscosity as witnessed by the ICI viscosity readings. However, compared to paints containing comparative examples the paints with the inventive polymers show improved low and medium shear viscosity. The advantage of this low shear impact is evident in the improved sag resistance imparted by the inventive polymers. Sag resistance is essential for both producers and consumers as coatings on slanted or vertical surfaces tend to sag when first applied. When the sag resistance of a latex paint is insufficient, the formulator will have to add additional thickener that is designed to increase low shear viscosity. This additional thickener increases the cost of the formulation and often leads to the degradation of the physical properties such as block resistance, stain resistance, scrub resistance, and others.

SG-10AF Latex

Conclusion: Improved Hiding Power with Inventive Polymers

The inventive polymers X.2 and X.3 have been compared in latex paint to polymers made in a random polymerization as described for comparative examples C.1, C.2 and C.3. As can be seen in Table 8, the inventive polymers are superior to the non-inventive comparative examples with respect to hiding power on application. In each case the polymers were added to the paint at three different levels to a 40% VS paint based on Rhoplex SG-10AF. The samples incorporated in the white pigmented paint were applied onto drywall with a roller applicator across a black primed surface. The inventive examples had improved hiding relative to comparative examples and to quantitate this improvement the color difference was measured (see method for rollout and color difference measurement procedure). The color difference between the painted black primed surface and unpainted white primed surface was significantly less for the inventive examples. A principal limitation of latex paints is the difficulty of achieving adequate hiding in a minimal number of coats. The high hiding power of the inventive examples decreases the number of coats needed by the consumer. A higher concentration of titanium dioxide in the paint may even lead to one coat hide with these inventive examples.

The invention claimed is:

1. A polymer comprising structural units according to formula (I),

wherein $R^1$ represents an organic group terminated by a hydrocarbyl group having 6 to 50 carbon atoms, X represents O or N—$R^5$, wherein $R^5$ represents a hydrogen atom or a hydrocarbyl group having 1 to 30 carbon atoms, $R^2$ represents a hydrocarbyl group comprising an aromatic group and having 6 to 40 carbon atoms, POA represents a polyoxyalkylene group, $R^3$ represents an organic group having 2 to 40 carbon atoms, n is an integer from 1 to 6, $R^4$ is independently selected from

—(C=O)—NH—$R^2$—NH—(C=O)—X—$R^1$,

—(C=O)—NH—$R^1$,

—$R^6$, wherein $R^6$ represents a hydrogen atom or an aliphatic or aromatic group having 1 to 24 carbon atoms, and wherein the polymer has an average of at least 1.8 end groups $R^1$ per molecule, a number average molecular weight in the range of 2000 to 100000 g/mol (Daltons), and a polydispersity in the range of 1.0 to 5.0, wherein a quotient of the polydispersity divided by (n+1) is less than 1.0.

2. The polymer according to claim 1, wherein X is O.

3. The polymer according to claim 1, wherein at least one $R^1$ represents a polyoxyalkylene group terminated by a hydrocarbyl group having 6 to 50 carbon atoms.

4. The polymer according to claim 1, wherein at least one $R^1$ represents a hydrocarbyl group having 6 to 30 carbon atoms.

5. The polymer according to claim 1, wherein the polyoxyalkylene group comprises repeating units selected from —[$C_2H_4$—O]— and —[$C_3H_6$—O]—.

6. The polymer according to claim 1, having a content of the structural units according to formula (I) of at least 70% by weight, calculated on the total mass of the polymer.

7. A process for preparing a polymer according to claim 1, comprising reacting a compound of formula $$R^1—X—(C═O)—NH—R^2—NCO \qquad (II)$$

and a compound of formula $$HO—POA\text{-}R^3—(O—POA\text{-}R^4)_n \qquad (III),$$

wherein $R^1$ represents an organic group terminated by a hydrocarbyl group having 6 to 50 carbon atoms, X represents O or N—$R^5$, wherein $R^5$ represents a hydrogen atom or a hydrocarbyl group having 1 to 30 carbon atoms, $R^2$ represents a hydrocarbyl group comprising an aromatic group and having 6 to 40 carbon atoms, POA represents a polyoxyalkylene group, $R^3$ represents an organic group having 2 to 40 carbon atoms, n is an integer from 1 to 6, and $R^4$ is independently selected from

—(C═O)—NH—$R^2$—NH—(C═O)—X—$R^1$,

—(C═O)—NH—$R^1$,

—$R^6$, wherein $R^6$ represents a hydrogen atom or an aliphatic or aromatic group having 1 to 24 carbon atoms.

8. The process according to claim 7, wherein the compound of formula (II) is obtained by reacting a diisocyanate of formula OCN—$R^2$—NCO (IV) and a compound of formula $R^1$—XH (V).

9. The process according to claim 8, wherein the isocyanate groups of the diisocyanate of formula (IV) differ in reactivity towards the compound of formula (V).

10. A composition comprising
   a) a continuous aqueous liquid phase,
   b) the polymer according to claim 1 dissolved in the continuous aqueous liquid phase, and
   c) a hydrophobic component dispersed in the continuous aqueous liquid phase.

11. The composition according to claim 10, wherein the hydrophobic component is an organic film-forming binder.

12. The composition according to claim 10, further comprising solid particles.

13. The composition according to claim 12, wherein the solid particles are selected from pigments, fillers, and combinations thereof.

14. An additive composition comprising
   a) 10.0 to 60.0% by weight of the polymer according to claim 1,
   b) 40.0 to 90.0% by weight of water,
   c) 0.0 to 1.0% by weight of a biocide, and
   d) 0.0 to 75.0% by weight of a viscosity depressant.

\* \* \* \* \*